W. SILVERMAN.
CERAMIC DECORATING MACHINE.
APPLICATION FILED JAN. 8, 1910.

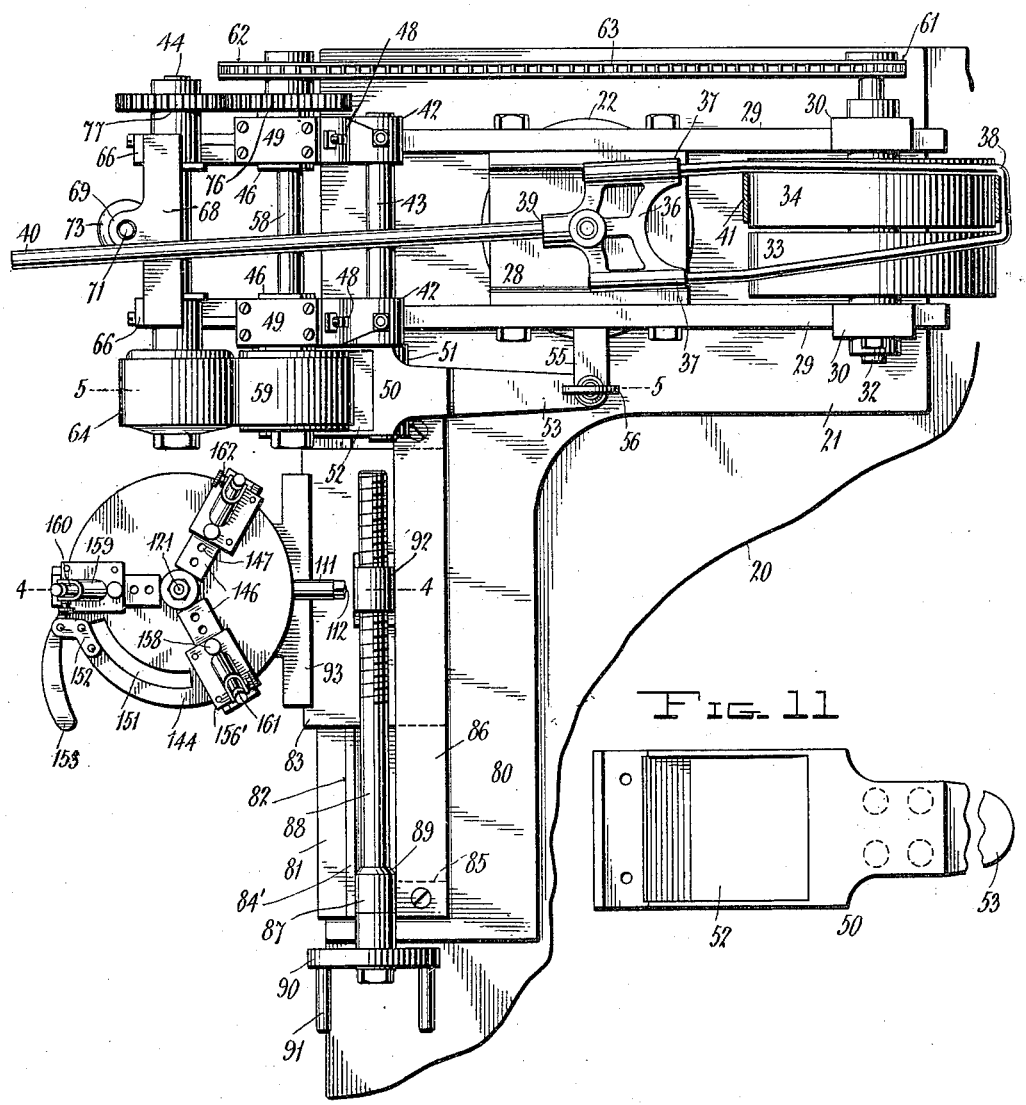

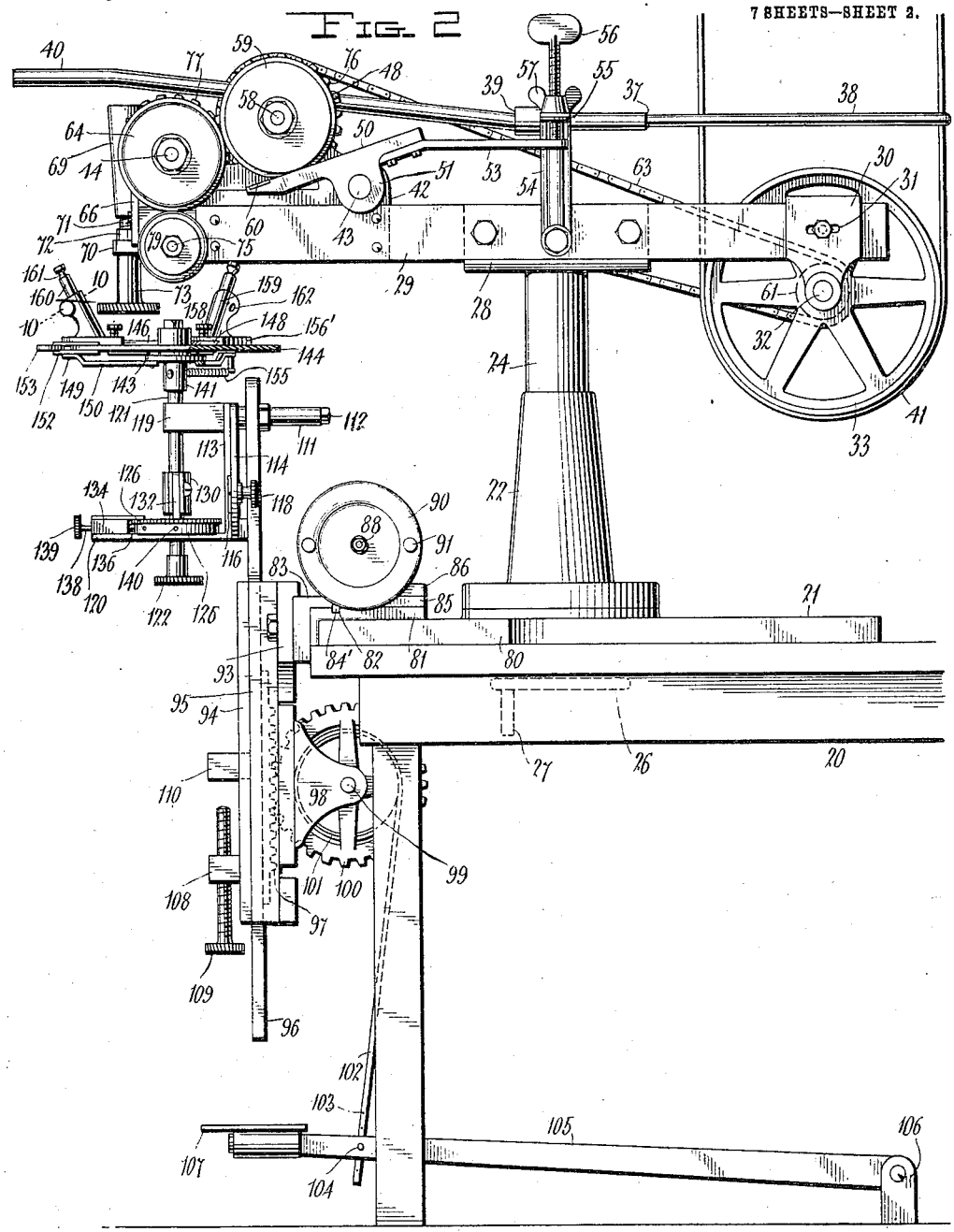

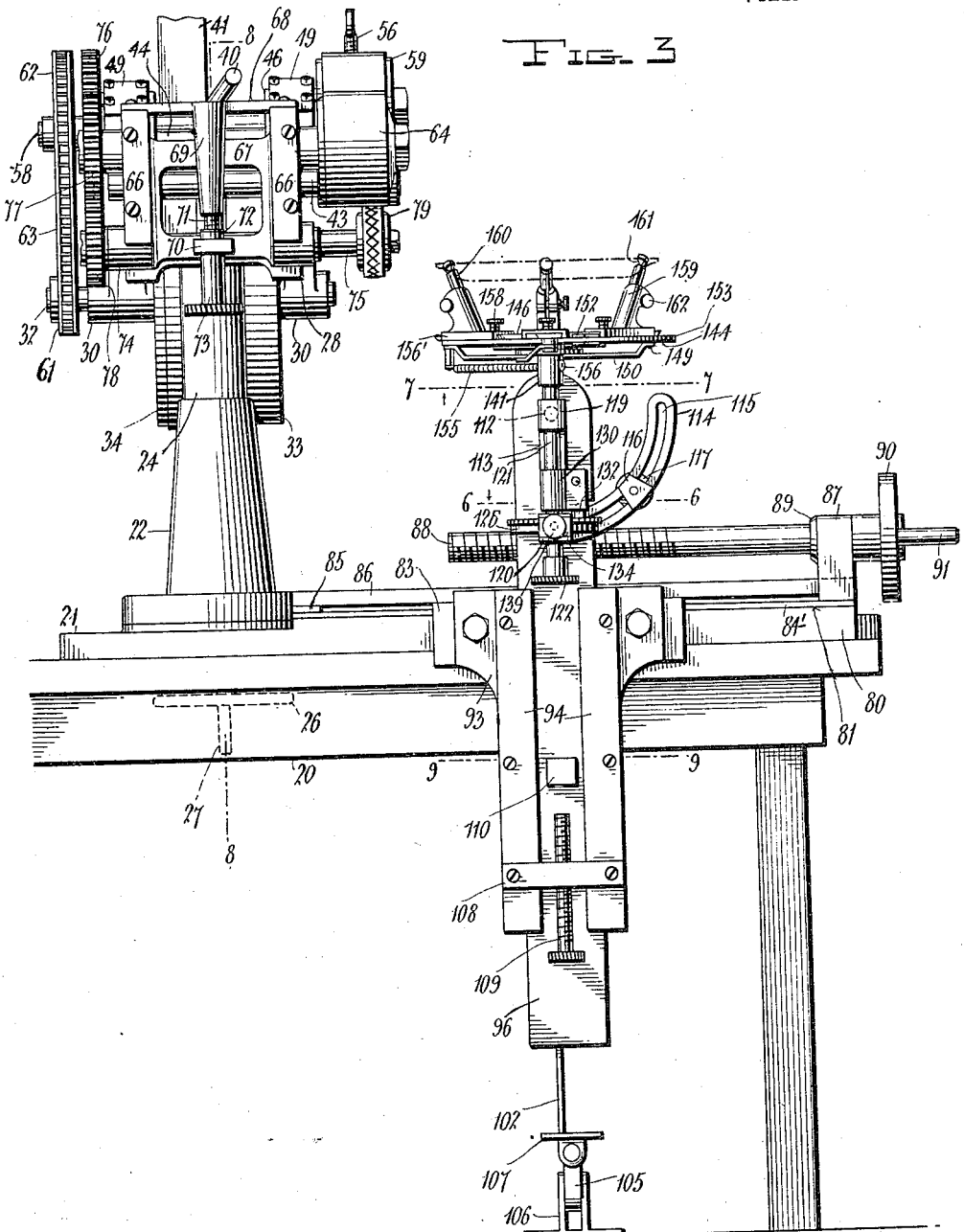

966,481.

Patented Aug. 9, 1910.
7 SHEETS—SHEET 4.

Witnesses

Inventor
William Silverman
By
Attorneys

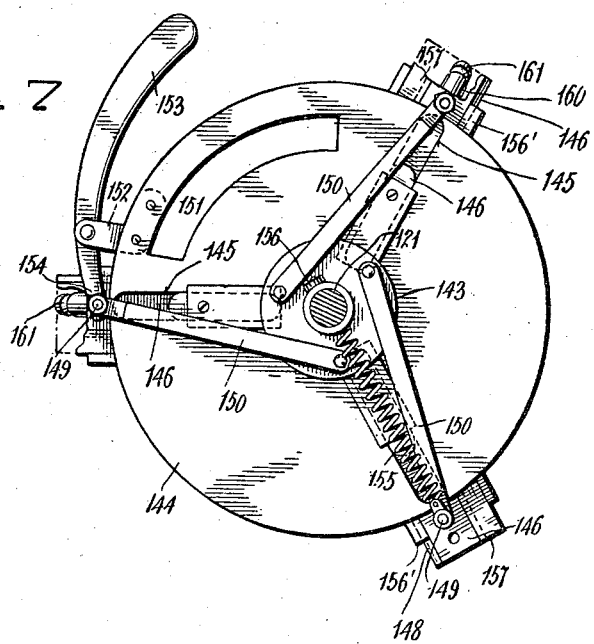
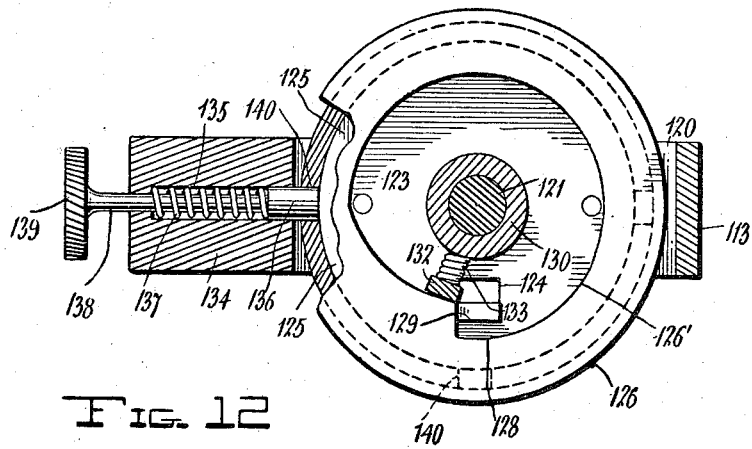
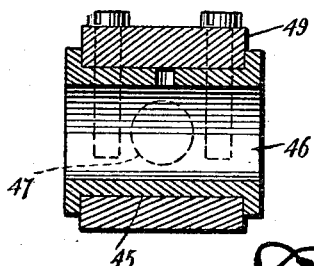

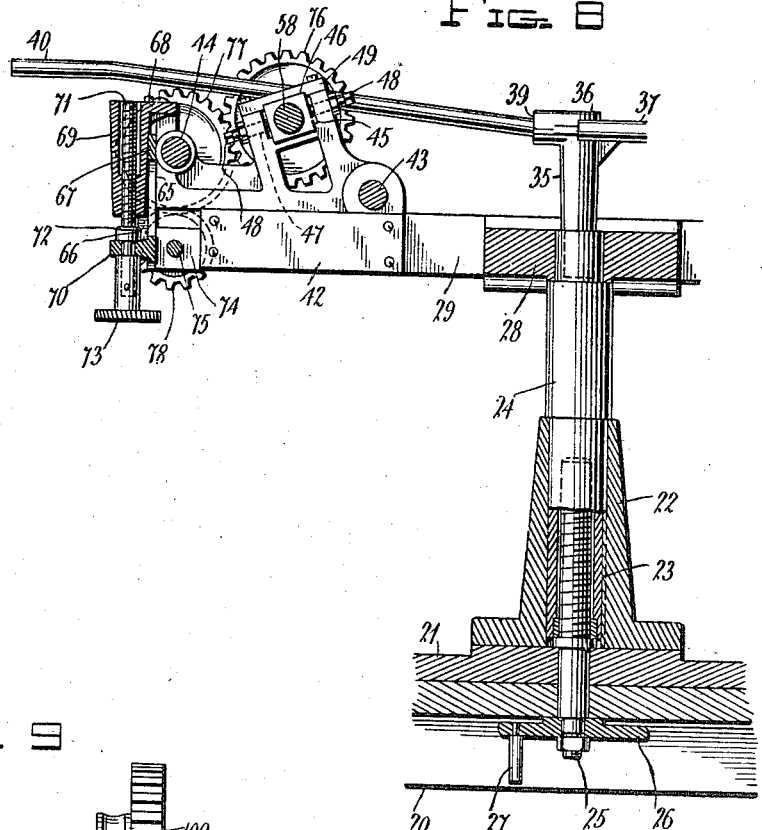
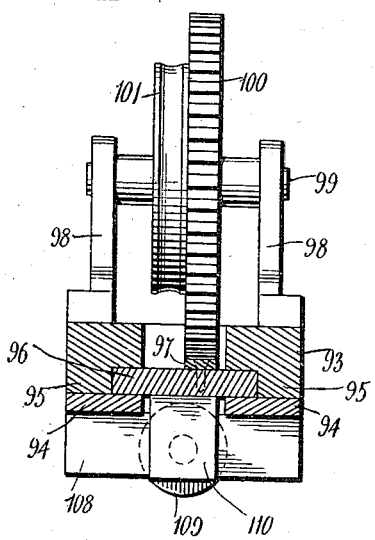
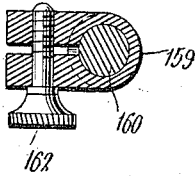

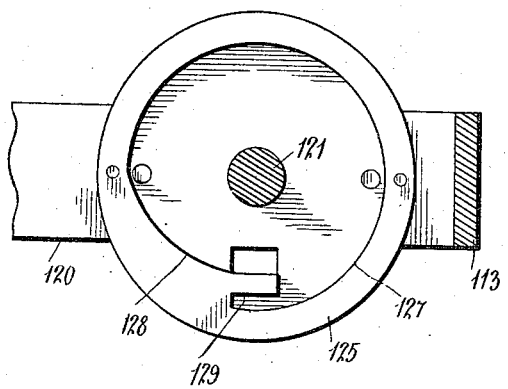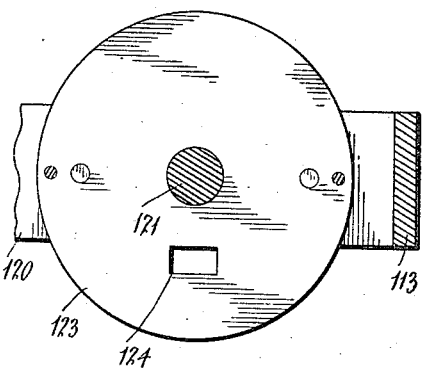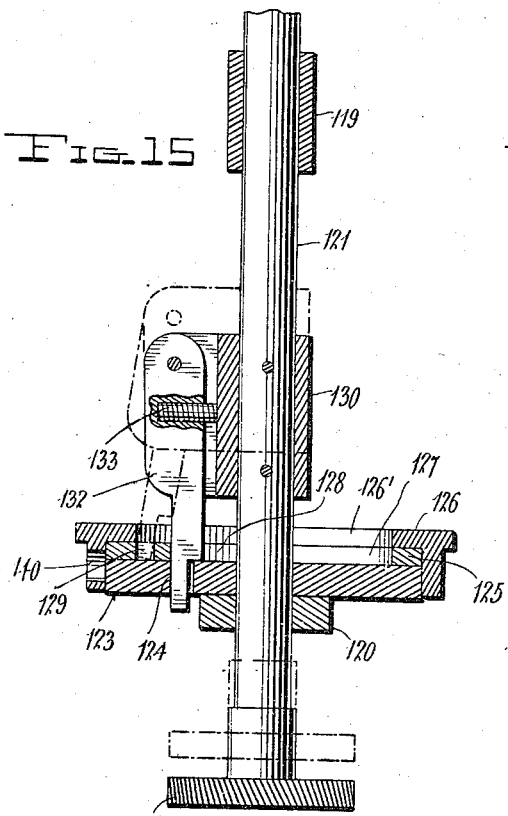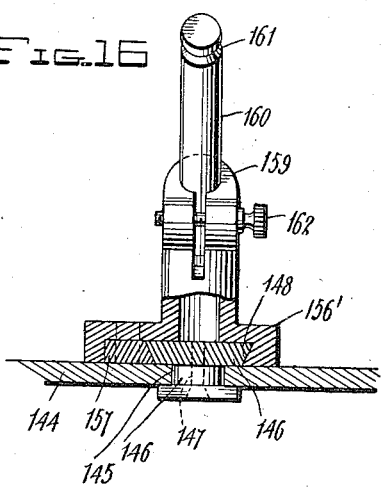

UNITED STATES PATENT OFFICE.

WILLIAM SILVERMAN, OF EAST LIVERPOOL, OHIO, ASSIGNOR OF ONE-HALF TO ASHTON O. C. AHRENDTS, OF EAST LIVERPOOL, OHIO.

CERAMIC-DECORATING MACHINE.

966,481.  Specification of Letters Patent.  Patented Aug. 9, 1910.

Application filed January 8, 1910. Serial No. 537,089.

*To all whom it may concern:*

Be it known that I, WILLIAM SILVERMAN, a citizen of the United States, residing at East Liverpool, in the county of Columbiana, State of Ohio, have invented certain new and useful Improvements in Ceramic-Decorating Machines; and I do hereby declare the following to be a full, clear, and exact description of the invention, such as will enable others skilled in the art to which it appertains to make and use the same.

This invention relates to machines for decorating ceramic ware and has especial reference to a machine for decorating the rims of plates.

The machine is particularly designed to imprint a border pattern around the rims of plates before the final firing common in the production of ceramics.

One object of the invention is to provide an improved machine wherein a revolving printing roller will be so arranged as to drive a dish around and at the same time imprint a pattern thereon.

A second object of the invention is to provide an improved means whereby the dish will be automatically moved away from the printing roller when one revolution, or such part thereof as may be desired, has been completed.

A third object of the invention is to provide an improved form of clutch designed especially to hold fragile articles without injury to the same and wherein skilful manual adjustment is rendered unnecessary.

A fourth object of the invention is to provide a clutch of this character which may be adjusted to different sizes of dishes while at the same time engaging all sizes with a substantially equal pressure.

A fifth object of the invention is to provide a clutch of this character which may be readily released from and applied to circular plates, the mechanism being of improved character.

A sixth object of the invention is to provide an improved mechanism for coating the printing roller with pigment.

With the above and other objects in view, as will be hereinafter apparent, the invention consists in general of a revolving printing roller fed with pigment by an improved inking mechanism in combination with an improved form of clutch for holding plates, saucers and the like.

The invention further consists in certain novel details of construction and combinations of parts hereinafter fully described, illustrated in the accompanying drawings, and specifically set forth in the claims.

Figure 5:
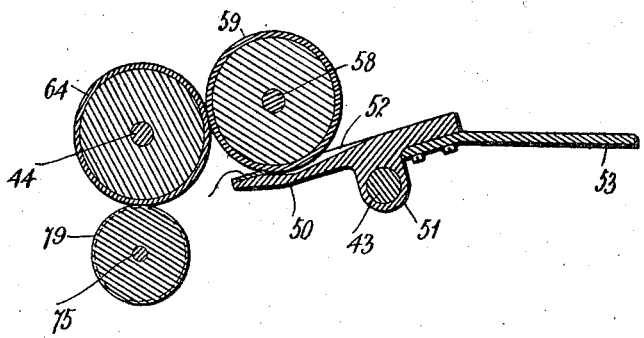
Figure 4:
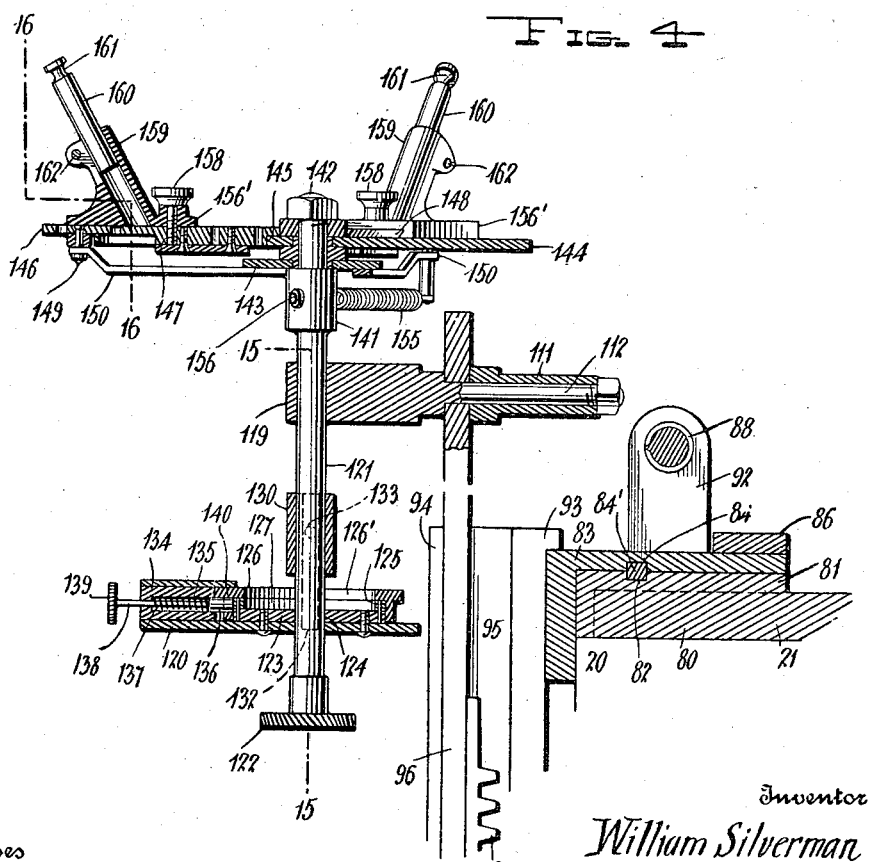

In the accompanying drawings, like characters of reference indicate like parts in the several views, and:—Figure 1 is a top plan view of a machine constructed in accordance with this invention. Fig. 2 is a side elevation of such a machine. Fig. 3 is a front elevation thereof. Fig. 4 is a detail sectional view on the line 4—4 of Fig. 1. Fig. 5 is a detail sectional view on the line 5—5 of Fig. 1. Fig. 6 is a detail view on the line 6—6 of Fig. 3. Fig. 7 is a section on the line 7—7 of Fig. 3 showing the bottom of the clutch and the mechanism actuating the same. Fig. 8 is a section on the line 8—8 of Fig. 3, the section showing only a portion of the mechanism. Fig. 9 is a section on the line 9—9 of Fig. 3. Fig. 10 is a transverse sectional view through a telescopic clutch finger used in this invention. Fig. 11 is a detail plan of the pigment holder. Fig. 12 is a detail view showing a bearing for the muller shaft. Fig. 13 is an enlarged detail view showing the bottom plate of the mechanism for automatically releasing the plate from the printing roller. Fig. 14 is a view similar to Fig. 13 but showing a certain cam plate in position. Fig. 15 is a section on the line 15—15 of Fig. 4. Fig. 16 is a section on the line 16—16 of Fig. 4.

The present embodiment of the invention is intended to be a machine of what is known as the bench type, that is to say, a machine adapted to be mounted on a table or bench, and this bench is here indicated by the numeral 20. Upon the bench 20 is mounted a base plate 21 and on this base plate is a standard 22, the same being provided with a centrally disposed opening 23 to receive a support 24. The support 24 is held within the standard by means of a screw 25 which extends through the table or bench 20 and is provided on its lower end with a hand wheel 26 wherefrom projects a handle 27. On the upper end of the support 24 is mounted a frame block 28 the sides whereof are parallel and securely attached to each of these sides is a frame bar 29. These bars are attached to the frame block intermediate their ends and at one end thereof there is bolted to each of these frame bars a pulley shaft bearing 30 provided with a slot 31 wherethrough the adjusting bolts pass so that the position of these bearings may be slightly varied in accordance with the circumstances of the case. Carried in these bearings is a pulley shaft 32 and between the frame bars 29 this shaft supports a fast pulley 33 and a loose pulley 34. Extending upward from the frame block 28 is a post 35 and on this post is mounted a shifter fork 36 provided with a pair of spaced sockets 37 wherein are held the ends of a shifter link 38. This shifter fork 36 furthermore has a socket 39 arranged to receive a shifter handle 40. A belt 41 driven from some suitable power source runs around one of the pulleys 33 or 34 and may be shifted to either the fast or loose pulley by moving the shifter handle 40 to the right or left as occasion requires. Upon the opposite ends of the frame bars there is mounted a pair of side plates 42. These side plates are each provided with a bearing to receive a shaft 43 and a second bearing to receive a shaft 44. Each of these side plates furthermore is provided with a bearing 45 wherein is held a bushing or brass 46, the latter being of less width than the bearing so that it may move transversely thereof. This bearing is preferably rectangular in shape and in the sides of the same it is provided with threaded openings 47 wherein are held adjusting screws 48 the ends of which bear against the bushing 46 and serve to move the same to desired position and hold it in place. Furthermore, the bearing is provided with a cap 49 securely bolted thereon, the cap being put into position after the bushing is placed in the bearing.

Mounted on the shaft 43, which projects over the side of one of the frame bars 29 for this purpose, is a pigment holder 50. This pigment holder is pivoted on the shaft in such manner that it may move therearound in a vertical plane of revolution and is provided with a downwardly extending lug 51 constituting a bearing for said shaft. Furthermore, the pigment holder is dished in its upper surface to form a species of rectangular saucer as indicated at 52. Secured to the pigment holder 50 is a spring steel bar 53 which projects back toward the pulleys previously described.

Secured to one of the frame bars 29 is a bracket 54 having a projecting lug 55 provided with a threaded hole. This bracket is so positioned that the lug 55 is directly over the end of the spring arm 53 and in the threaded hole in the lug is held a thumb screw 56 provided with a lock nut 57. The lower end of this thumb screw 56 bears against the upper surface of the end of the spring arm 53 and the thumb screw is designed for the purpose of properly adjusting the pigment holder 50, the lock nut being for the usual purpose of preventing accidental change in adjustment. Mounted in the bushings 46 is a shaft 58 whereon is carried a roller 59 which is of approximately the same width as the saucer-like depression 52 in the pigment holder and is designed to enter this depression and gather pigment from the holder. It will now be plain that the spring arm 53 is arranged to hold the pigment holder firmly against the roller 59 and that the thumb screw 56 regulates the amount of pressure between the pigment holder and the roller 59. In order to prevent too great a quantity of pigment being taken up by the roller 59 the pigment holder is provided with a scraper blade 60 which has a beveled edge arranged to closely engage the surface of the roller 59. It will furthermore be noted that by means of the adjusting screws 48 the position of the roller with reference to the scraper 60 may be regulated so that only the desired amount of pigment is carried over by this roller.

It will be obvious that in order to have the roller 59 take up the pigment the same must be revolved, and to accomplish this object the shaft 32 has keyed thereon a sprocket 61 and the shaft 58 carries a sprocket 62, the two sprockets being connected by the usual sprocket chain 63. Upon the shaft 44 is mounted a feeding roller 64 the periphery of which bears against the roller 59 and the pressure between these two rollers is also adjusted by means of the screws 48.

Each of the side plates 42 has formed therein a rabbet 65 and on the ends of these side plates are mounted guide plates 66. Between the faces of the rabbets and the guide plates 66 is slidably mounted a cross head 67. On top of the side plates 42 and connecting the same is what is preferably termed an adjusting bar 68 which is provided with a projecting tubiform extension 69 threaded throughout a portion of its length. On the cross head 67 is formed a peripheral lug 70 and through this lug extends the unthreaded portion of a screw 71 provided with a collar 72 which rests on top of the lug. The upper end of the screw 71 is held in the tubiform extension 69 and in order to rotate this screw, upon the lower end there is mounted a hand wheel 73 preferably provided with a knurled periphery as clearly indicated in the drawings. It will now be obvious that by rotating the hand wheel 73 the cross head may be moved up and down in its guides.

The cross head 67 is provided with oppositely disposed bearings 74 wherein is held a shaft 75. Upon the shaft 58 is mounted a gear wheel 76 and upon the shaft 44 is mounted a similar gear wheel 77 which meshes with the gear wheel 76 so that as the shaft 58 is rotated the shaft 44 will also be rotated. Upon the shaft 75 is mounted a gear wheel 78 which meshes with the gear wheel 77 thus insuring the regular rotation of all three shafts. The shaft 75 has one of its ends projecting beneath the roller 64 and this end is arranged with a reduced portion to receive a bearing or printing roll 79 whereon is provided a peripherally disposed ornamental design as can be clearly seen by reference to Fig. 3. It is intended that the printing rollers 79 should be of such sizes as desired and to this end the adjustment of the cross head previously described is provided so that the printing roller 79 may be held in proper contact with the feeding roller 64.

In the operation of the device as thus far described when the belt is started and the shifter handle moved to throw the said belt on the tight pulley the sprocket 61 is rotated and this in turn, by means of the chain 63, rotates the sprocket 62 and its shaft 58. As the shaft 58 revolves the roller 59 takes up pigment from the pigment holder 50 and delivers it to the feeding roller 64 from whence it is delivered to the printing roller 79, all three rollers being kept in movement by the train of gears previously described. This operation continues just so long as the belt is on the fast pulley but it will be obvious that when the belt is thrown on the loose pulley by proper movement of the shifter handle the rotation of the rollers and supply of pigment ceases.

Upon the base 21 is formed an extension 80 and along the edge of this extension runs a single shear 81 having a longitudinal groove 82 formed therein. Carried on the shear 81 is an apron 83 provided with a groove 84 which registers with the groove 82 of the shear. In the groove 82 is pressed a length of square cold roll steel 84' to form a rib projecting above the shear and the groove 84 is made of such dimensions as to form a sliding fit on said rib. At each end of the shear 81 and adjacent the rear thereof is a distance block 85. Upon these distance blocks is fixed a guide bar 86 beneath which projects the rear edge of the apron and by this means the apron is held in position on the shear. Projecting upward from one end of the shear is a bearing 87 through which extends a feed screw 88 provided with a collar 89 on one side of the block and with a removable hand wheel 90 on the opposite side of the bearing 87, the hand wheel being provided preferably with handles 91. Extending upward from the apron 83 is a threaded boss 92 wherethrough passes the threaded portion of the screw 88. It will now be plain that by rotating the screw 88 the apron 83 will be moved to or from the direction of the bearing 87 in accordance with the direction of rotation of the screw.

Secured to the apron 83 is a vertical guide plate 93 provided with cover plates 94 which rest on upstanding lateral ribs 95 so as to make a species of T-slot. Within the guide formed by this T-slot extends a chuck supporting bar 96 which is provided on its rear face with a rack 97. Upon the guide plate 93 at the rear thereof there are bearings 98 which support a shaft 99 whereon is mounted a gear wheel 100 which meshes with the rack 97. There is also carried on the shaft 99 a belt wheel or drum 101 around which is led a belt 102 one end whereof is firmly secured to the drum while the opposite end is provided with a series of perforations 103 arranged to receive a pin 104 which serves to secure this end of the belt to a lever 105. This lever is pivoted to the floor at any convenient place as 106 and is provided with a foot treadle 107. The belt pulley has the belt wound thereon in such manner that as the foot treadle 107 is depressed the bar 96 will be raised up in the slide. In order to limit the downward movement of this bar there is mounted on the guide plate 94 a plate 108 having a suitable threaded opening to receive an adjusting screw 109 provided with a knurled head. There is also formed on the bar 96 a boss 110 which projects outward through the opening between the edges of the plates 94 and by means of turning the screw 109 up or down the point of the screw will be struck by the boss 110 at any preferred position and the downward movement of the bar 96 thus arrested.

Upon the upper end of the chuck supporting bar 96 is a chuck bar bearing 111 wherein is journaled a spindle 112 to the end of which is attached a bracket 113 so arranged that it may swing in a vertical plane by reason of the rotation of the spindle in the bearing. In order to limit its movement the chuck bar 96 has mounted thereon a quadrant 114 which is preferably in the form of a slotted bar, the slot being indicated at 115. This quadrant is formed on an arc whose center lies in the axis of the spindle 112. Mounted in the slot 115 is a block 116 provided with an arcuate rib 117 of the same curvature as and fitting within said slot, the block 116 lying on one side thereof. The block 116 is provided with a threaded centrally disposed opening and in this opening is held the screw of a knurled head screw 118 so arranged as to clamp the block firmly in adjusted position on the quadrant 114. Extending outward from the upper part of the bracket 113 is a bearing boss 119 and from the lower part of the bracket 113 extends outwardly a shelf or platform 120. Both the bearing boss and shelf are provided with alined openings for the reception of a chuck spindle 121 provided on its lower end with a hand grip 122 having a knurled periphery. On the shelf 120 is supported a plate 123 provided with an opening 124 extending therethrough and upon this plate 123 is fitted a plate 125 having a centrally disposed opening so as to form a species of cam which comprises a concentrically disposed portion 127 of relatively large diameter, an eccentrically disposed portion 128 and a recess 129 which lies behind the extremity of the eccentric portion 128. This eccentric portion 128 is so arranged that the extremity thereof alines with the outer wall of the opening 124. Carried on these two plates is a knurled edged cap 126 provided with an opening forming, by its periphery, a cam curve 126' similar to the cam curve just described but without the recess.

On the spindle 121 is held a sleeve 130 whereto is pivoted the upper end of an arm 132 between the lower end of which and the clamp is mounted a compression spring 133. Held upon the shelf 120 is a block 134 provided with a centrally disposed opening 135 wherein moves a pin 136 normally forced toward the spindle by means of a spring 137 and this pin is provided with a stem 138 which passes outward through the block 134 and is provided with a finger grip 139 so that the pin may be retracted against the stress exerted by the spring. Around the periphery of the cap 126 is a series of recesses 140. These recesses are spaced at suitable angles for purposes hereinafter to be described.

Upon the upper end of the spindle 121 is a collar 141 and above the collar the spindle is provided with a reduced end 142. On this reduced end immediately above the collar is mounted a plate 143 which is freely revoluble upon said reduced end. Above this reduced end is a chuck plate 144 provided with a series of radial slots 145 preferably three in number. Slidably mounted in each of said slots is a chuck jaw block 146 provided with a series of recesses 147 spaced along the upper face thereof and the upper part of each block is dovetailed as can clearly be seen at 148. Beneath each of the blocks 146 and at the outer end thereof there is provided a downwardly extending pin 149 and to each of the pins 149 is connected the end of one of a series of links 150, the opposite ends of which are connected to the plate 143 in such manner as to make this plate a wrist plate. The chuck plate 144 is furthermore provided with a finger slot 151 and adjacent this finger slot a bracket 152 is secured to the plate and extends out therefrom. Pivoted to this bracket 152 is a hand lever 153 provided with a hooked end 154 which engages around one of the pins 149 on its inner side, the pin being made sufficiently long to permit such engagement. By means of this arrangement when the handle of the lever 153 is moved toward the chuck plate 144 by the fingers of the operator's hand being placed in the opening 151 and his thumb engaging the handle of said lever, the pin 149 against which the lever bears is forced outward and carries with it its block 146. The link 150 attached to this pin causes the wrist plate 143 to rotate and forces the several blocks outward simultaneously. In order to retract these blocks one of the pins 149 has attached thereto one end of a spring 155 the opposite end of which is attached to the boss 141 as clearly shown at 156.

Mounted on each of the blocks 146 is a chuck jaw which comprises a base portion 156' having a slotted under side one edge of which is beveled. This slot is of greater width than the dove-tailed portion of the block and in order to prevent the base portion 156 from lifting off its respective block a gib 157 is inserted between the side of the slot and the block 148. In order to hold this base plate in adjusted position on its block a headed pin 158 is provided which moves through a suitable opening in its respective base plate and is adapted to have its point enter one of the recesses 147 according to the adjustment desired. Upon each of the base plates is formed an upwardly and outwardly inclined split tubiform member 159 wherein is telescopically mounted an article gripping jaw 160 provided around its outer end with a groove 161 adapted to receive the edge of a plate, saucer, butter-plate or the like. The two edges of the slot by means of which the tubiform member 159 is split are arranged to be drawn together by a clamping screw 162 so that the plate gripping member 160 may be securely held in adjusted relation. It will now be obvious that according as the size of the articles to be gripped varies, so also will the position of the clutch jaw bases on their respective blocks be varied and that such adjustment may further be aided by moving the members 160 in and out of their respective split sleeves. There is thereby provided a wide range of adjustment while at the same time the adjustment may be made sufficiently delicate to prevent injury by the chipping of the edges of the finest ceramics.

In the operation of the device, the operator takes his position in front of the machine, the hand wheel 90 being to his right, and a pile of undecorated or partially decorated chinaware such as plates being arranged conveniently at hand. He then proceeds to adjust the chuck jaws by proper arrangement of the pins 158 in the holes 147 and by arranging the members 160 in their respective split sockets. This having been done he opens the chuck by pressing on the lever 153 and places a plate between the jaws. Upon releasing the chuck the edges of the plate will be gripped in the grooves 161 and the plate will be ready for printing. He now sets the stop block 116 to such position that when the lower end of the chuck spindle is swung to the right the portion of the plate to be printed will be precisely parallel to the surface of the printing roller 79. He furthermore, adjusts the screw 88 so that the part of the plate to be printed will lie directly beneath the printing roller 79 when the spindle is elevated by lifting up on the hand grip 122. As he lifts up on this hand grip the lower end of the arm 132 is forced outward by means of the spring 133 and by reason of the position of the parts at starting always being that shown in Fig. 6 this end will be positioned in the recess 129. The shifter lever or handle 40 is then moved to bring the belt on the tight pulley. This starts the pigment feeding mechanism previously described as well as the printing roller 79. The operator now places his foot on the treadle 107 and this lifts the bar 96 until the plate is brought in contact with the printing roller 79. As this occurs the plate acts in connection with the printing roller as a friction gear and causes the chuck and its spindle to rotate. This causes the lower end of the arm 132 to follow around the cam surface formed in the cap 125 until a complete revolution is made. When this complete revolution is made the arm 132 is immediately over the recess 124 and the weight of the chuck and spindle will cause them to drop, thus freeing the plate from the printing roller and at the same time the arm will act as a stop to prevent further revolution. The operator now allows the chuck to move to a horizontal position, opens the same, takes out the printed plate and replaces it with a fresh unprinted plate. The plates are then carried to the oven for firing in the usual manner.

It sometimes happens that it is desirable to print a monogram or the like in a different color from the balance of the border or pattern printed by this means. In that event the grip 139 is pulled out and the cap 125 rotated until the suitable opening 140 comes opposite the pin 136 when the grip is released and the pin allowed to engage that opening. The result of this will be to advance the cap around a circle so that when it is desired to start the machine the hand grip 122 is grasped and the spindle raised as before and then given a turn to the left until the lower end of the member 132 moves off what may be termed the high portion of the cam surface 126' onto the low portion thereof. The balance of the operation is completed in the usual manner with the exception that the space through which the arm 132 is turned manually will be left blank on the article to be decorated.

The reason for making this provision in this manner is that by starting always against the shoulder between the high and low portions of the cam an even and definite space on the plate will positively be printed.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In a ceramic decorating machine, a rotatable clutch, a revolving printing roller, a carrier for said clutch, means to move said carrier laterally to and from the printing roller, a pedal operated elevating mechanism for said clutch and carrier, and an independent manually operated means for moving said clutch upward with reference to the carrier.

2. In a ceramic decorating machine, a rotatable clutch, a revolving printing roller, a carrier for said clutch, a pivotal connection between the clutch and carrier, a quadrant on said carrier concentric with the pivot of the clutch, a stop adapted to be secured in selective positions on the quadrant and lying in the path of a portion of the clutch to limit its movement around said pivotal connection, means to move said carrier laterally to and from the printing roller, pedal operated means to raise said clutch and carrier vertically, and manually operable means to move said clutch with reference to said carrier.

3. In a ceramic decorating machine, a rotatable clutch, a revolving printing roller, means to move said clutch to bring an article held therein in contact with the roller whereby the article and roller are frictionally engaged, the clutch and article rotated and the latter printed, locking means to hold the article and roller in engagement and a release mechanism whereby the clutch is permitted to fall away from the roller when said clutch has rotated through a predetermined angle.

4. In a ceramic decorating machine, a printing roller, a rotatable clutch, a carrier for said clutch, means to move said carrier laterally to and from the printing roller, an elevating mechanism for said clutch, a locking mechanism for a portion of said elevating mechanism, and a release mechanism whereby the clutch is permitted to drop when the same has revolved through a predetermined angle.

5. A clutch provided with a plate having a series of slots extending radially thereof, sliding blocks mounted in said slots, and telescopic fingers mounted on the blocks and extending upward and outward from the plate.

6. A clutch provided with a plate having a series of slots extending radially thereof, sliding blocks mounted in said slots, telescopic fingers slidably mounted on the blocks and extending upward and outward from the plate, and means to hold the fingers in adjusted position on the blocks.

7. A clutch provided with a plate having a series of slots extending radially thereof, sliding blocks mounted in said slots, telescopic fingers mounted on the blocks and extending upward and outward from the plate, and means to simultaneously move all of said blocks to and fro in said slots.

8. A clutch provided with a plate having a series of slots extending radially thereof, sliding blocks mounted in said slots, a jaw mounted on each block, each jaw comprising a base slidable on its block, a split tubiform extension formed on the base and inclined outwardly with reference to the center of the clutch, a gripping finger slidably held in said tubiform extension, and means to draw the edges of the several tubes together and clamp the fingers in position; and means to hold the bases in adjusted positions on their blocks.

9. A clutch provided with a plate having a series of slots extending radially thereof, sliding blocks mounted in said slots, a jaw mounted on each block, each jaw comprising a base slidable on its block, a split tubiform extension formed on the base and inclined outwardly with reference to the center of the clutch, a gripping finger slidably held in said tubiform extension, and means to draw the edges of the several tubes together and clamp the fingers in position; and means to hold the bases in adjusted positions on their blocks; in combination with means to simultaneously move said blocks along their respective slots.

10. In a device of the kind described, a bracket, a clutch spindle slidable and revoluble in the bracket, a plate provided with an opening therethrough and supported by the bracket, an arm having one end pivotally attached to the spindle and the opposite end resting on said plate, a spring normally pressing said arm in one direction, and a cam arranged to guide the lower end of said arm into registry with said opening upon the completion of a predetermined movement.

11. In a device of the kind described, a bracket, a clutch spindle slidable and revoluble in the bracket, a plate provided with an opening therethrough and supported by the bracket, an arm having one end pivotally attached to the spindle and the opposite end resting on said plate, a spring normally pressing said arm in one direction, a cam arranged to guide the lower end of said arm into registry with said opening upon the completion of a predetermined movement, a cap fitting over said cam, and means to hold said cap in adjusted position on the cam whereby the arc of movement of the cam is varied.

In testimony whereof, I affix my signature, in presence of two witnesses.

WILLIAM SILVERMAN.

Witnesses:
W. J. BRUER,
E. M. R. MARSHALL.